R. M. LEGGETT.
APPARATUS FOR STERILIZING WATER.
APPLICATION FILED SEPT. 7, 1915.
1,172,468.
Patented Feb. 22, 1916.
2 SHEETS—SHEET 1.
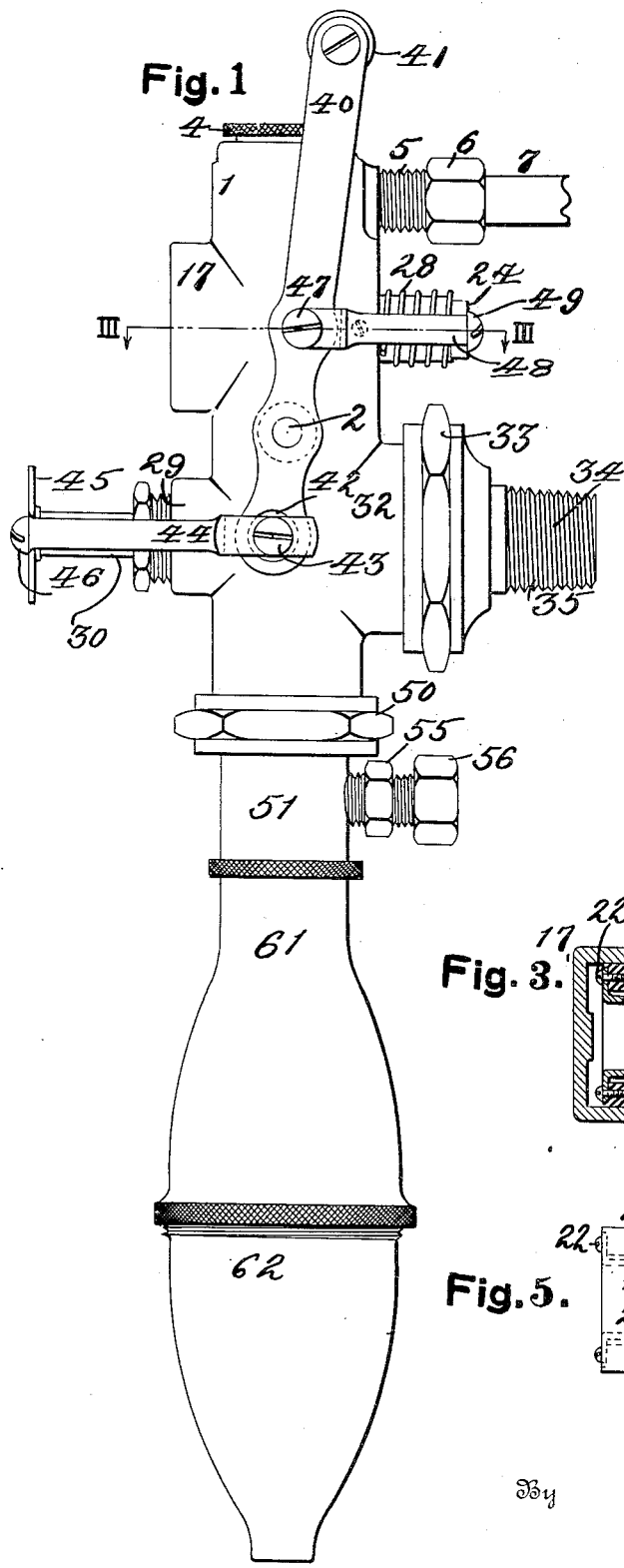
Fig. 1.
Fig. 4.
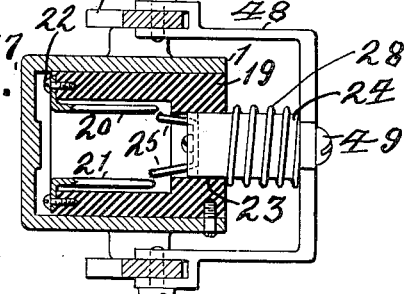
Fig. 3.
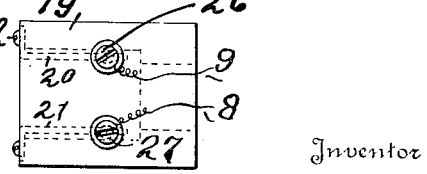
Fig. 5.
Inventor
Ross M. Leggett
C. E. Humphrey
By
Attorney

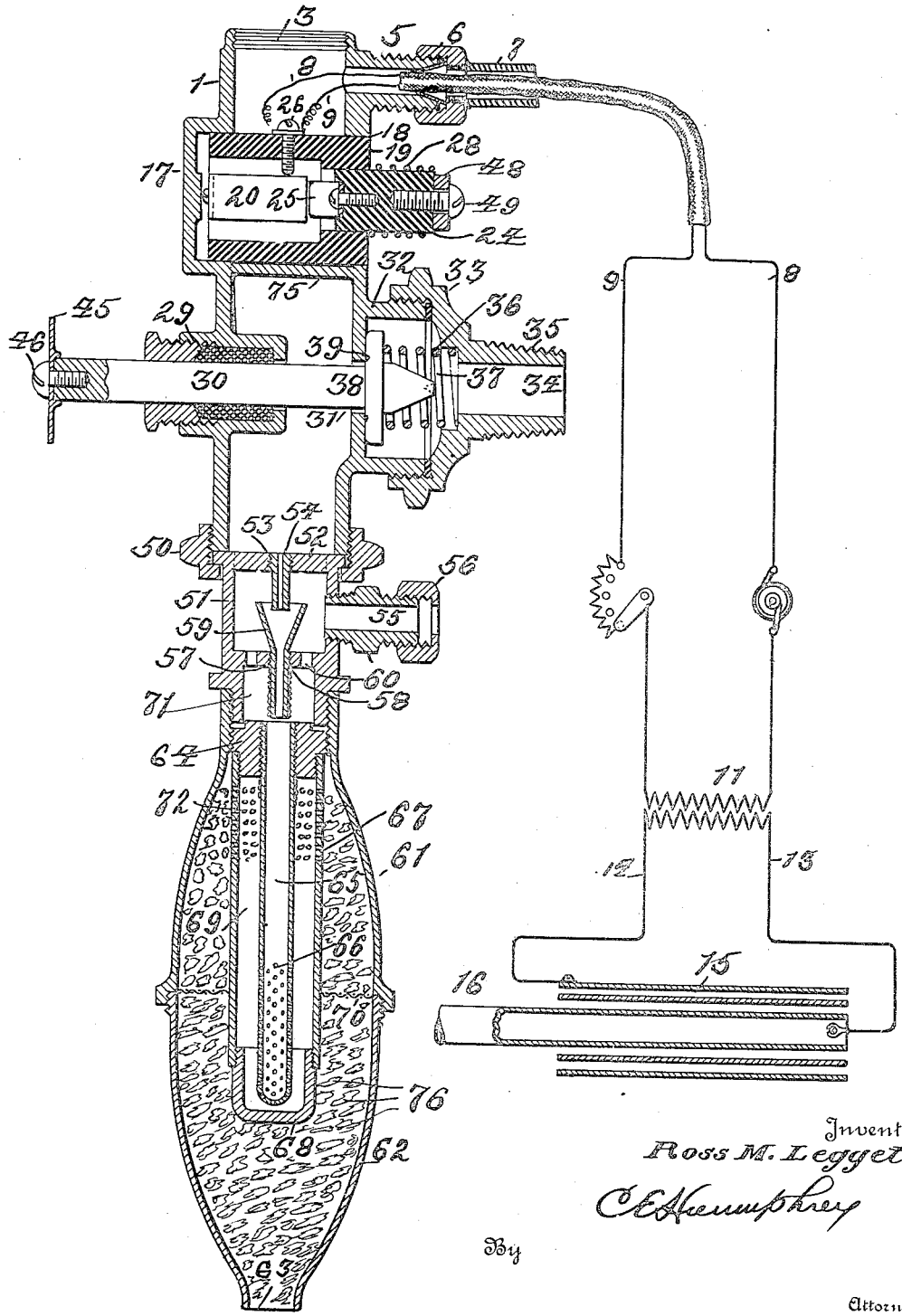

UNITED STATES PATENT OFFICE.

ROSS M. LEGGETT, OF AKRON, OHIO, ASSIGNOR TO THE NEAL-ARMSTRONG COMPANY, OF AKRON, OHIO, A CORPORATION OF MAINE.

APPARATUS FOR STERILIZING WATER.

1,172,468.      Specification of Letters Patent.      Patented Feb. 22, 1916.

Application filed September 7, 1915. Serial No. 49,301.

*To all whom it may concern:*

Be it known that I, Ross M. LEGGETT, a citizen of the United States, residing at Akron, in the county of Summit and State of Ohio, have invented new and useful Improvements in Apparatus for Sterilizing Water, of which the following is a specification.

This invention relates to improvements in apparatus for sterilizing water by mixing therewith some sterilizing fluid such, for instance, as ozone.

More specifically the invention contemplates the provision of a faucet adapted to be connected with a source of water supply under pressure and also with a source of a sterilizing fluid, such for instance, as ozone or ozonized air and equipped with mechanism for thoroughly agitating the water and mingling with it a sufficient quantity of a sterilizing fluid such as ozone or ozonized air before moving the valve controlling the water supply to its open position and maintaining the introduction and incorporation of the ozone with the water as long as the water flows through the faucet.

A further object of the invention is to provide efficient means for mingling sterilizing fluid with the water passing through a faucet, in such a manner that during a violent agitation of the water there will be incorporated therein a sterilizing medium of sufficient strength and quantity to kill all bacteria which may be contained and carried by the water.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a device embodying this invention; Fig. 2, is a vertical, central view of the device shown in Fig. 1, also showing diagrammatically the ozone-producing apparatus; Fig. 3, is a sectional view on lines III; and, Fig. 4, is a plan view of a bushing with wires connected therewith. Fig. 5 is a plan view of the insulating bushing.

Referring to the drawings in detail the reference numeral 1 denotes the body portion of a faucet which is provided approximately centrally and on opposite sides with laterally-projecting pins 2 constituting trunnions for a purpose to be later described. The body portion 1 is provided at its upper end with interior threads 3 to receive a threaded cap or closure member 4. The body member 1 is also provided at one side with an exteriorly-threaded hollow stem 5 adapted to receive the enlarged end 6 of a conduit 7 through which extend wires 8 and 9 constituting portions of an electric circuit in which is an alternating current generator 10, a transformer 11 and a rheostat 12. The transformer 11 produces a secondary current in a circuit comprising wires 13 and 14 interposed in which is an ozone-producing mechanism 15 from which the ozone is discharged by the pipe 16. The body portion 1 below the stem 5 is provided on one side with a cylindrical offset 17, the interior of which constitutes a recess, and in alinement with a reduced opening 18 in the opposite wall thereof, Positioned in the opening 18 and the recess in the offset 17 is a tubular bushing 19 of insulating material. Secured to the inner end of the bushing 19 and oppositely disposed to one another are two terminals 20 and 21. These terminals consist of spring fingers extending in parallelism with the inner wall of the bushing 19 and arm held in position by holding members 22. The bushing 19 is provided at one end with a contracted opening 23 communicating with the main opening, in which is shiftably mounted a plunger 24, also formed of insulating material. Secured to the inner end of the member 24 are a pair of contact fingers 25. The insulating bushing 19 is provided with a pair of screws 26 and 27 connecting respectively with the contact fingers 20 and 21 and these screws constitute binding-posts for the terminals of the wires 9 and 8 respectively. The plunger 24 is exteriorly-surrounded by a coiled spring 28 for a purpose to be later described.

Below the bushing 19 is a fluid-tight partition 75 extending entirely across the body portion 1. Below the partition 75 in the wall of the body member 1 is a packing gland 29 through which extends a valve stem 30 and oppositely disposed to and in axial alinement with the valve stem 30 is an opening 31 through which the valve stem projects. Surrounding the opening 31 is an exteriorly-threaded annular flange 32 to which is secured the enlarged interiorly-threaded end 33 of a water inlet pipe 34 provided with exterior threads 35 for connection with a source of water supply under pressure. The interior of the member 34 is provided with a recess 36 constituting a seat for a spring 37. Fixedly secured to the projecting end of the valve stem 30 is a valve 38 adapted to be engaged by the spring 37 for holding it against a valve seat 39 which surrounds the opening 31.

Mounted on each of the pins or trunnions 2 is a lever 40 the upper ends of which are connected together by an operating handle 41 and the lower ends are provided with openings 42 to loosely receive the pins 43 carried by the free ends of a yoke 44 the intermediate portion 45 of which is secured by a screw 46 to the outer projecting end of the valve stem 30. Pivotally connected by means of pins 47 to each lever 40 between the pins 2 and the handle 41 is a yoke 48 the intermediate portion of which is connected by means of a screw 49 with the plunger 24. The lower exterior portion of the body portion 1 is exteriorly-threaded to receive a coupling or union 50 for securing thereto a tubular member 51 which constitutes a mixing chamber, which is provided with a transverse septum or diaphragm 52 at its upper end in which is a centrally-disposed interiorly-threaded opening 53 to receive a vertically-adjustable discharge nozzle 54. The chamber 51 is provided in the lateral wall thereof with a removable nipple 55 provided with a coupling member 56 to connect it with the pipe 16 carrying ozone or other sterilizing fluid. Intermediate the upper and lower ends of the mixing chamber 51 is a diaphragm 57 provided with a centrally-disposed interiorly-threaded opening 58 in which is mounted a funnel-shaped member 59 exteriorly provided with screw threads so as to be capable of being raised or lowered as desired. Spaced from the opening 58 and spaced from each other are a plurality of smaller openings 60. The lower exterior portion of the mixing chamber 51 is exteriorly-threaded to receive the upper half 61 of the bulb-shaped member which is interiorly-screw-threaded to co-act therewith. The lower portion of the member 61 is provided with a peripheral flange which is interiorly-threaded to receive a lower member 62 having a contracted discharge opening 63. Mounted on the threads in the upper portion of the member 61 is a nipple 64 provided with a central screw-threaded aperture in which is mounted a tube 65 the lower end of which is provided with a plurality of minute perforations 66 the lower closed end of which is provided with minute perforations. The lower portion of the nipple 64 is reduced and is exteriorly threaded to receive the upper threaded end of a tube 67 the lower end of which is interiorly-threaded to receive a closure member 68. The upper end of the tube 67 is provided with minute perforations 72. The members 67 and 68 are greater in diameter than the tube 65 to provide a space 69 between them. Secured between the two portions 61 and 62 of the bulb-shaped member is a foraminous or reticulated diaphragm 70. The space within the bulb-shaped element made up of the members 61 and 62 surrounding the members 67 and 68 is filled or substantially filled with a mass of comminuted substance such, for instance as crushed porcelain, cork, glass or the like and designated in the drawings by the reference numeral 76.

The normal position of the parts is as shown in Fig. 2 with the valve 38 in engagement with the valve seat 39 which prevents the passage of water from the inlet pipe 34 to the interior of the body of the member 1 and also the contact fingers 25 are out of electrical contact with the terminals 20 and 21. When the operating handle 41 is rocked to the left in Fig. 1 the fingers 25 are first moved into engagement with the terminals 20 and 21 closing the circuit through the generator 10 which produces a supply of ozone in the pipe 16 which passes through the nipple 55 into the mixing chamber 51. This production of ozone takes place substantially instantaneous with the slightest movement of the handle 41 to the left, this being due to the fact that the yoke 48 is securely connected by means of the pins 47 with lever 40. This movement of the lever can take place without in any way moving the valve 30 to its open position due to the openings 42 at the lower ends of the levers 40 which are considerably larger than the diameter of the pins 43 but if the movement of the lever 40 to the left is continued the pins 43 will be engaged by the walls of the openings 42 and the yoke 44 is then shifted to the right which forces the valve 38 outwardly from the valve-seat 39 thereby moving the valve to its open or operative position permitting the water to pass from the inlet supply pipe through the member 34 and the opening 31, down through the tube 54 into the funnel-shaped member 59 by which an injector action is set up for drawing in with it a portion of the ozone which is fed into the mixing chamber 51 through the pipe 16. The action of the jet of water passing from the nozzle 54 into the funnel-shaped member 55 serves to partially mix the ozone and water together for the destruction of bacteria contained in the water from the source of supply. However, I have discovered by extended experiments the jet of water from the tube 54 does not draw with it enough ozone from the mixing chamber to thoroughly render the water sterile and hence, any surplus ozone which exists in the upper portion of the mixing chamber 51 above the diaphragm 57 passes through the openings 60 into the lower portion of the chamber designated by the reference numeral 71, and from there is drawn into the pipe 65 by the partial vacuum created in the mixing chamber by the discharge from the lower end of the funnel-shaped member 59 into the pipe 65 and in doing so it mingles with the jet of water discharged from the member 59 whereby a second commingling and agitation of the water and ozone takes place. It will be noted that the diameter of the bore of the member 59 is less than the tube 65 and is spaced therefrom to permit the passage of the ozone from the chamber 71 into the tube 65 and it is pointed out that the member 59 is vertically adjustable so as to permit the space to be varied at will, to increase or decrease the drawing or vacuum-producing functions of the members 59 and 65.

Authorities have agreed for years that ozone would destroy germs in water, but always qualified their opinion by the statement that the two prime essentials are necessary: One, mixture of ozone and water, and second, intimate contact for a period of time long enough for oxidation to take place.

The prime essentials in the purification of water with ozone is, first, intimate mixture; second, a means of preserving this mixture through a long enough period of contact to insure purification through oxidation. The first aspirator comprising the members 54 and 59 serves to draw enough ozone from the ozone-generator through the pipe 16 to keep the mixing chamber 51 full of ozone. The water passing down through the funnel-shaped member 59 carries with it a large amount of ozone, but not a full charge. As the jet of water passes through the member 59 into the tube 65 it draws in with it an additional and full charge of ozone which passes from the chamber 51 through the openings 60 for this purpose. The water is now fully charged with ozone and in this condition and still under pressure, is free to flow, and is forced through the minute orifices 66 upwardly through the space 69 and outwardly through the minute orifices 72 and is further dashed about among the numerous particles of broken porcelain or other comminuted substance 76 inclosed by the members 61 and 62. In passing from the interior of the upper member 61 downwardly it passes through the foraminous or reticulated member 70 which further serves to break up or intermingle the water with the ozone or ozonized air and from thence the purified water passes downwardly and out through the exit 63.

It is pointed out that in order to make the device absolutely safe and prevent short-circuiting of the electrical current the partition 75 is provided, which absolutely prevents the passage of water or moisture from the interior of the body member 1 upwardly into the recess into which is mounted the bushing 19 carrying the electrical terminals, so that in this device there is no open connection between the circuit-breaking device and the source of water supply.

I claim:—

1. In an apparatus for sterilizing water, a water supply means and a sterilizing fluid supply means, a tubular member constituting a mixing chamber, a jet nozzle in said mixing chamber, a receiving-pipe positioned in the floor of said mixing chamber and spaced from said jet nozzle and in alinement therewith to receive the water from said nozzle and the sterilizing fluid from said chamber, the floor of said mixing chamber provided with an aperture, a second chamber positioned below said floor, a receiving-pipe in alinement with said first receiving-pipe and spaced therefrom positioned below said second mixing-chamber and adapted to receive the mixture of sterilizing fluid through said orifice and the water passing through said first receiving-pipe whereby they are mixed and discharged into said second receiving-pipe, and a discharge pipe communicating with said second receiving pipe.

2. In an apparatus for sterilizing water, a water-supply means, a tubular member constituting a mixing chamber and having a jet-forming nozzle projecting into said chamber and in open communication with the interior thereof, an inlet for sterilizing fluid communicating with said mixing chamber, an adjustably-mounted receiving-pipe spaced from said jet nozzle and in alinement therewith to receive the water from said jet for creating a partial vacuum in said chamber for drawing the sterilizing fluid into said receiving pipe, a second mixing chamber positioned adjacent to said first mixing chamber and in open communication therewith, a depending-pipe in open communication with said second mixing-chamber and in alinement with said receiving pipe and spaced therefrom to permit the sterilizing fluid in said second mixing chamber to be drawn into said depending-pipe.

3. In an apparatus for sterilizing water, a water-supply means, a tubular member constituting a mixing-chamber and having a jet-forming nozzle projecting into said chamber and in open communication with the interior thereof, an inlet for sterilizing fluid communicating with said mixing-chamber, an adjustably-mounted receiving pipe spaced from said jet-nozzle and in alinement therewith to receive the water from said jet for creating a partial vacuum in said chamber for drawing the sterilizing fluid into said receiving-pipe, a second mixing chamber positioned adjacent to said first mixing chamber and in open communication therewith, a depending-pipe in open communication with said second mixing-chamber and in alinement with said receiving-pipe and spaced therefrom to permit the sterilizing fluid in said second mixing-chamber to be drawn into said depending pipe, said depending pipe provided at its lower end with a plurality of minute orifices, a second pipe inclosing said last-named pipe and having its lower end closed and its upper end provided with minute perforations, and a casing inclosing said pipes and provided with a discharge opening at its lower end.

4. In an apparatus for sterilizing water, a water-supply means, a tubular member constituting a mixing-chamber and having a jet-forming nozzle projecting into said chamber and in open communication with the interior thereof, an inlet for sterilizing fluid communicating with said mixing-chamber, an adjustably-mounted receiving-pipe spaced from said jet nozzle and in alinement therewith to receive the water from said jet for creating a partial vacuum in said chamber for drawing the sterilizing fluid into said receiving pipe, a second mixing-chamber positioned adjacent to said first mixing-chamber and in open communication therewith, a depending-pipe in open communication with said second mixing chamber and in alinement with said receiving-pipe and spaced therefrom to permit the sterilizing fluid in said second mixing chamber to be drawn into said depending-pipe, said depending pipe provided at its lower end with a plurality of minute orifices, a second pipe inclosing said last named pipe and having its lower end closed and its upper end provided with minute perforations, a casing inclosing said pipes and provided with a discharge opening at its lower end, a reticulated diaphragm extending across the space between said outer pipe and said casing.

5. In an apparatus for sterilizing water, a water-supply means, a tubular member constituting a mixing-chamber and having a jet-forming nozzle projecting into said chamber and in open communication with the interior thereof, an inlet for sterilizing-fluid communicating with said mixing-chamber, an adjustably-mounted receiving pipe spaced from said jet nozzle and in alinement therewith to receive the water from said jet for creating a partial vacuum in said chamber for drawing the sterilizing fluid into said receiving-pipe, a second mixing-chamber positioned adjacent to said first mixing-chamber and in open communication therewith, a depending-pipe in open communication with said second mixing-chamber and in alinement with said receiving-pipe and spaced therefrom to permit the sterilizing fluid in said second mixing-chamber to be drawn into said depending pipe, said depending pipe provided at its lower end with a plurality of minute orifices, a second pipe inclosing said last named pipe and having its lower end closed and its upper end provided with minute perforations, a casing inclosing said pipes and provided with a discharge-opening at its lower end, a reticulated diaphragm extending across the space between said outer pipe and said casing, and a mass of comminuted material positioned in the space between said casing and said outer tube.

6. An apparatus for sterilizing water including a water supply provided with a valve, a chamber into which the water flows when the valve is moved to its open position, a jet nozzle leading from said chamber, a receiving-pipe spaced from said jet nozzle and in alinement therewith to receive the water from said nozzle to create a partial vacuum, a tubular member constituting a chamber surrounding said nozzle and pipe, said chamber provided with an inlet for sterilizing fluid, the floor of said chamber provided with an opening, a second chamber positioned below said first chamber in open communication therewith, a depending pipe leading from said second chamber, and in alinement with said receiving-pipe and spaced therefrom to create a partial vacuum in said second chamber, the space between the lower end of said receiving-pipe and said depending-pipe permitting the sterilizing fluid contained in said second chamber to pass into said depending-pipe.

7. An apparatus for sterilizing water including a water supply provided with a valve, a chamber into which the water flows when the valve is moved to its open position, a jet nozzle leading from said chamber, a receiving pipe spaced from said jet nozzle and in alinement therewith to receive the water from said nozzle to create a partial vacuum, a tubular member constituting a chamber surrounding said nozzle and pipe, said chamber provided with an inlet for sterilizing fluid, the floor of said chamber provided with an opening, a second chamber positioned below said first chamber in open communication therewith, a depending-pipe leading from said second chamber, and in alinement with said receiving-pipe and spaced therefrom to create a partial vacuum in said second chamber, the space between the lower end of said receiving-pipe and said depending-pipe permitting the sterilizing fluid contained in said second chamber to pass into said depending-pipe, said depending-pipe provided at its lower end with minute perforations, a pipe surrounding said depending-pipe having a closed lower end and provided at its upper end with minute perforations and an inclosing casing into which the water passes from the outer pipe, and a discharge opening in said casing.

In testimony whereof I have hereunto set my hand.

ROSS M. LEGGETT.

Copies of this patent may be obtained for five cents each, by addressing the "Commissioner of Patents, Washington, D. C."